United States Patent
Lee et al.

(10) Patent No.: US 9,978,306 B2
(45) Date of Patent: May 22, 2018

(54) DISPLAY APPARATUS

(71) Applicant: Samsung Display Co., Ltd., Yongin-si (KR)

(72) Inventors: Gichang Lee, Asan-si (KR); Insoo Wang, Asan-si (KR); Yongsoo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 76 days.

(21) Appl. No.: 14/848,691

(22) Filed: Sep. 9, 2015

(65) Prior Publication Data

US 2016/0275910 A1    Sep. 22, 2016

(30) Foreign Application Priority Data

Mar. 20, 2015 (KR) ......................... 10-2015-0039184

(51) Int. Cl.
*G09G 5/02* (2006.01)
*G09G 3/3225* (2016.01)

(52) U.S. Cl.
CPC ....... *G09G 3/3225* (2013.01); *G02F 2201/56* (2013.01); *G09G 2300/0452* (2013.01); *G09G 2330/021* (2013.01); *G09G 2340/0407* (2013.01)

(58) Field of Classification Search
CPC .................................. G09G 5/02; G09G 3/32
See application file for complete search history.

(56) References Cited

U.S. PATENT DOCUMENTS

| 2009/0115933 | A1* | 5/2009 | Mimura ............ G02F 1/133512 349/59 |
| 2013/0307759 | A1* | 11/2013 | Jang ...................... H01L 27/322 345/76 |
| 2014/0132584 | A1 | 5/2014 | Kim |
| 2015/0097837 | A1* | 4/2015 | Jepsen .................. G06F 3/1446 345/428 |

FOREIGN PATENT DOCUMENTS

| KR | 10-2009-0059661 | 6/2009 |
| KR | 10-2011-0065823 | 6/2011 |
| KR | 10-2011-0070169 | 6/2011 |
| KR | 10-2011-0130177 | 12/2011 |
| KR | 10-2012-0004119 | 1/2012 |
| KR | 10-2014-0061140 | 5/2014 |

* cited by examiner

*Primary Examiner* — Tony N Ngo
(74) *Attorney, Agent, or Firm* — H.C. Park & Associates, PLC

(57) ABSTRACT

A display apparatus includes first pixel groups each including first pixels disposed in a display area, and sub-pixel groups each including second pixels disposed at an outermost area of the display area and surrounding the first pixels, in which each of the second pixels has a size smaller than a size of each of the first pixels, the second pixels in each of the sub-pixel groups are respectively connected to each other in parallel.

20 Claims, 8 Drawing Sheets

DISPLAY APPARATUS

CROSS-REFERENCE TO RELATED APPLICATION

This application claims priority from and the benefit of Korean Patent Application No. 10-2015-0039184, filed on Mar. 20, 2015, which is hereby incorporated by reference for all purposes as if fully set forth herein.

BACKGROUND

Field

Exemplary embodiments of the present invention relate to a display apparatus, more particularly, to a display apparatus having improved display quality.

Discussion of the Background

An organic light emitting display device may include an organic light emitting diode including an anode electrode, an organic light emitting layer, and a cathode electrode. The organic light emitting diode may emit light using energy generated when excitons recombined in the organic light emitting layer return to a ground state from an excited state. The organic light emitting display device may display a predetermined image using light emission of the organic light emitting layer.

The organic light emitting display device has a self-luminance characteristic and may not require a separate light source, unlike a liquid crystal display device, and thus a thickness and a weight of the organic light emitting display device may be reduced. In addition, the organic light emitting display device may have low power consumption, high brightness, fast response time, etc.

The display device may include a display area having a curved shape, e.g., a circular shape, an oval shape, etc. The display device including the curved display area may be applicable to devices, such as a watch, an instrument panel of a car, etc.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display apparatus having improved display quality.

Additional aspects will be set forth in the detailed description which follows, and, in part, will be apparent from the disclosure, or may be learned by practice of the inventive concept.

According to an exemplary embodiment of the present invention, a display apparatus includes first pixel groups each including first pixels disposed in a display area, and sub-pixel groups each including second pixels disposed at an outermost area of the display area and surrounding the first pixels, in which each of the second pixels has a size smaller than a size of each of the first pixels, and the second pixels in each of the sub-pixel groups are respectively connected to each other in parallel.

A boundary of the display area may have a curved shape.

The display area may have a circular shape or an oval shape.

The first pixels of each of the first pixel groups may include a red pixel, a green pixel, and a blue pixel.

The second pixels of each of the sub-pixel groups may include sub-pixels configured to display the same color.

The second pixels of each of the sub-pixel groups may include sub-pixels configured to display different colors from each other.

The second pixels of each of the sub-pixel groups may include a red sub-pixel, a green sub-pixel, and a blue sub-pixel.

Each of the first pixels may include a first organic light emitting diode and a first transistor configured to drive the first organic light emitting diode.

The first organic light emitting diode may include a first electrode connected to the first transistor, a first organic light emitting layer disposed on the first electrode and including an organic material, and a second electrode disposed on the first organic light emitting layer.

Each of the sub-pixel groups may further include a second transistor configured to drive the second pixels, and each of the second pixels may include a second organic light emitting diode configured to be driven by the second transistor.

The second organic light emitting diode may have a size smaller than a size of the first organic light emitting diode.

The second transistor may include a control terminal connected to a data line through a switching device that is configured to be turned on in response to a gate signal, an input terminal connected to a first source voltage line that is configured to receive a first source voltage, and an output terminal connected to input terminals of the second organic light emitting diodes, and output terminals of the second organic light emitting diodes may be connected to a second source voltage line configured to receive a second source voltage having a voltage level less than the first source voltage.

Each of the second organic light emitting diode may include a third electrode connected to an output terminal of the second transistor, a second organic light emitting layer disposed on the third electrode and comprising an organic material, and a fourth electrode disposed on the second organic light emitting layer, and the third electrodes of the second organic light emitting diodes may be electrically connected to each other.

The display apparatus may further include connection lines connecting the third electrodes to each other.

The connection lines may have a width less than or equal to a width of the third electrodes.

The third electrodes may include the same material as the connection lines.

Each of the third electrodes may include a transmissive electrode and the fourth electrode may include a reflective electrode.

Each of the third electrodes may include a reflective electrode and the fourth electrode may include comprises a transmissive electrode.

An area of each of the first pixel groups may be the same as an area of each of the sub-pixel groups.

According to the exemplary embodiments of the present invention, the display apparatus may improve the display quality thereof.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
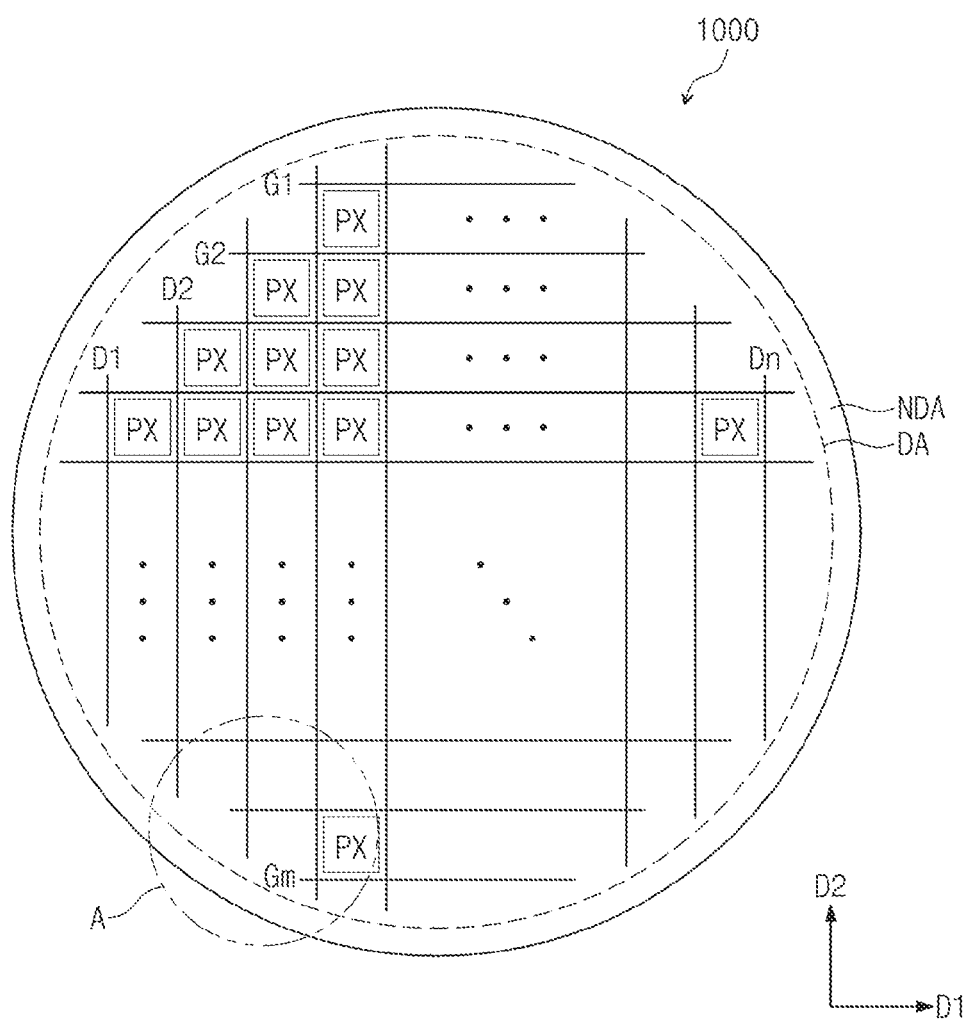
FIG. 1 is a plan view showing a display apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
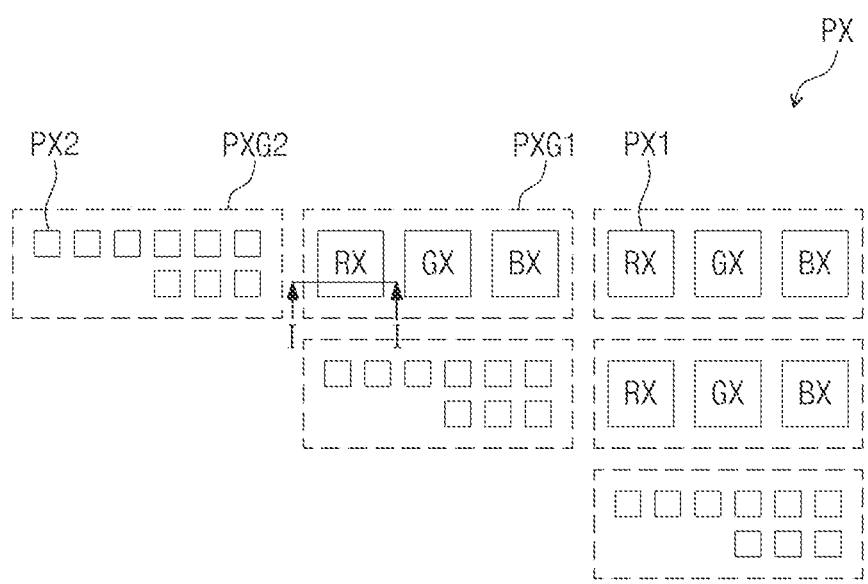
FIG. 2 is an enlarged view showing area "A" shown in FIG. 1.

FIG. 1 is a plan view showing a display apparatus 1000 according to an exemplary embodiment of the present invention and FIG. 2 is an enlarged view of area "A" shown in FIG. 1.

Referring to FIGS. 1 and 2, the display apparatus 1000 may be an organic light emitting display apparatus. The display apparatus 1000 includes a display area DA in which an image is displayed and a non-display area NDA surrounding the display area DA. The display apparatus 1000 includes pixels arranged in the display area DA. The pixels include organic light emitting display elements.

A boundary of the display area DA of the display apparatus 1000 has a curved shape, e.g., a circular shape, an oval shape, etc. In FIG. 1, the display area DA and the non-display area NDA of the display apparatus 1000 have the circular shape, but the boundary of the non-display area NDA may not need to have the curved shape.

The display area DA includes gate lines GL1 to GLm, data lines DL1 to DLn, and pixels PX each connected to a corresponding gate line of the gate lines GL1 to GLm and a corresponding data line of the data lines DL1 to DLn. The gate lines GL1 to GLm are insulated from the data lines DL1 to DLn while crossing the data lines DL1 to DLn. The gate lines GL1 to GLm extend in a first direction D1 and are arranged in a second direction D2 crossing the first direction D1, and the data lines DL1 to DLn extend in the second direction D2 and are arranged in the first direction D1.

Each of the gate lines GL1 to GLm and the data lines DL1 to DLn may have a different length. More particularly, the length of the gate lines GL1 to GLm increases as a distance thereof to a center portion of the display area DA decreases, and the length of the data lines DL1 to DLn increases as a distance thereof to a center portion of the display area DA decreases.

The pixels PX are arranged in a matrix form on the display area DA and disposed in a circular shape to correspond to the shape of the display area DA. The pixels PX include first pixel groups PXG1 and second pixel groups PXG2 disposed at an outermost position of the display area DA to surround the first pixel group PXG1. The first pixel groups PXG1 are arranged in the center portion of the display area DA and the second pixel groups PXG2 are arranged in an area adjacent to the boundary of the display area DA. The shape of the display area DA is determined by the second pixel groups PXG2.

Each of the first pixel groups PXG1 includes first pixels PX1. Each of the first pixels PX1 is connected to the corresponding gate line of the gate lines GL1 to GLm. Although not shown, each of the data lines DL1 to DLn includes three sub-data lines (not shown). Each of the first pixels PX1 is connected to a corresponding sub-data line of the sub-data lines.

The first pixels PX1 display different colors. The first pixels PX1 include a red pixel RX, a green pixel GX, and a blue pixel BX. FIG. 1 illustrates only the red, green, and blue pixels RX, GX, and BX, but the first pixel group PX1 may further include a white pixel (not shown). The first pixels PX1 have substantially a rectangular shape as shown in FIG. 1. Alternatively, each of the first pixels PX1 may have various shapes, e.g., a polygonal shape, a circular shape, an oval shape, etc.

Each of the second pixel group PXG2 includes second pixels PX2. Each of the second pixels PX2 has a size smaller than a size of each of the first pixels PX1. The second pixel group PXG2 will be described in detail with reference to FIG. 4.

Figure 3A:
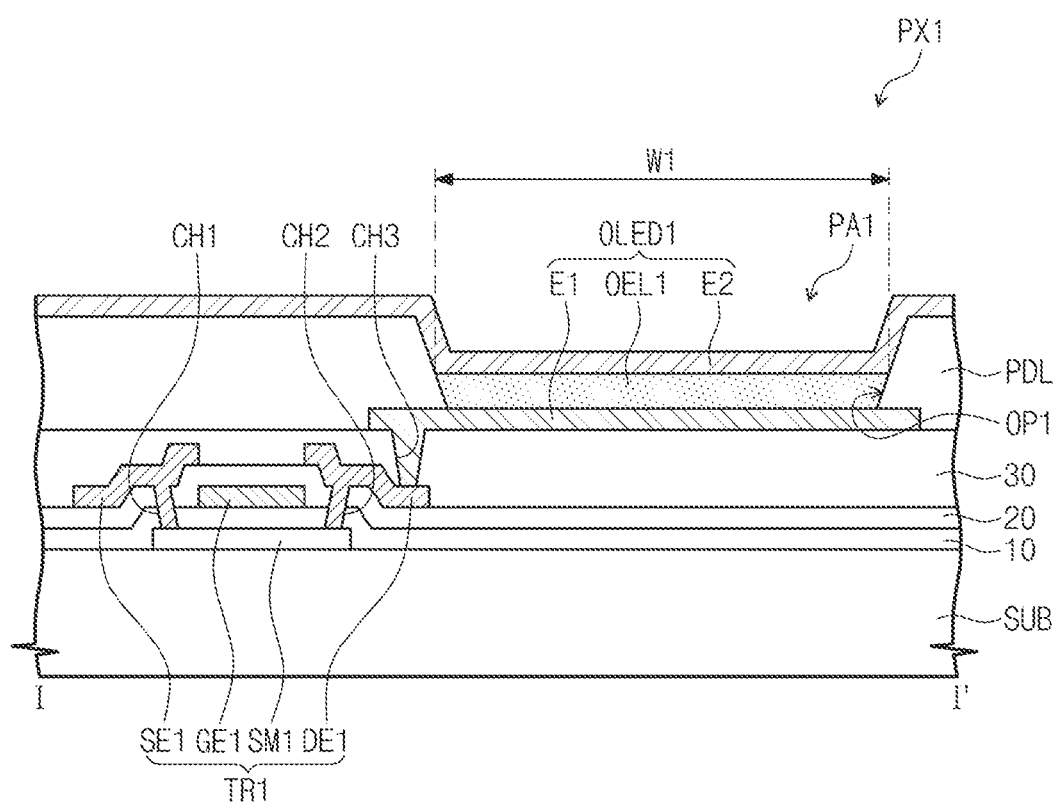
FIG. 3A is a cross-sectional view taken along line I-I' of FIG. 2.

FIG. 3A is a cross-sectional view taken along line I-I' of FIG. 2.

Referring to FIG. 3A, the first pixel PX1 includes a first organic light emitting diode OLED1 and a first transistor TR1 connected to the first organic light emitting diode OLED1. The first transistor TR1 is disposed on a substrate SUB. The substrate SUB may be a transparent flexible substrate formed of a plastic material.

A first semiconductor layer SM1 of the first transistor TR1 is disposed on the substrate SUB. The first semiconductor layer SM1 includes an inorganic semiconductor, e.g., amorphous silicon, polysilicon, etc., or an organic semiconductor. In addition, the first semiconductor SM1 may include an oxide semiconductor. Although not shown in FIG. 3A, the first semiconductor layer SM1 includes a source area, a drain area, and a channel area between the source area and the drain area.

A first insulating layer 10 is disposed on the substrate SUB to cover the first semiconductor layer SM1. The first insulating layer 10 may be an inorganic insulating material including an inorganic material. A first gate electrode GE1 of the first transistor TR1 is disposed on the first insulating layer 10 to overlap with the first semiconductor layer SM1. The first gate electrode GE1 is disposed to overlap with the channel area of the first semiconductor layer SM1.

A second insulating layer 20 is disposed on the first insulating layer 10 to cover the first gate electrode GE1. The second insulating layer 20 may be an inter-insulating layer. The second insulating layer 20 may be an inorganic insulating material including an inorganic material. A first source electrode SE1 and a first drain electrode DE1 of the first transistor TR1 are disposed on the second insulating layer 20 and spaced apart from each other. The first source electrode SE1 is connected to the source area of the first semiconductor layer SM1 through a first contact hole CH1 formed through the first and second insulating layers 10 and 20. The first drain electrode DE1 is connected to the drain area of the first semiconductor layer SM1 through a second contact hole CH2 formed through the first and second insulating layers 10 and 20.

A third insulating layer 30 is disposed on the second insulating layer 20 to cover the first source electrode SE1 and the first drain electrode DE1 of the first transistor TR1. The third insulating layer 30 may be an organic insulating material including an organic material.

A first electrode E1 of the first organic light emitting diode OLED1 is disposed on the third insulating layer 30. The first electrode E1 is connected to the first drain electrode DE1 of the first transistor TR1 through a third contact hole CH3 formed through the third insulating layer 30. The first electrode E1 may be referred to as a pixel electrode, an anode electrode, or an input terminal. The first electrode E1 may include a transmissive electrode or a reflective electrode.

A pixel definition layer PDL is disposed on the first electrode E1 and the third insulating layer 30 to expose a predetermined area of the first electrode E1. The pixel definition layer PDL includes a first opening OP1 formed therethrough to expose the predetermined area of the first electrode E1. The area corresponding to the first opening OP1 is referred to as a first pixel area PA1. The first pixel area PA1 has a first width W1.

A first organic light emitting layer OEL1 is disposed on the first electrode E1 in the first opening OP1. The first organic light emitting layer OEL1 according to the present exemplary embodiment may include an organic material generating a red, green, or blue light. Accordingly, the first organic light emitting layer OEL1 generates the red, green, or blue light.

The first organic light emitting layer OEL1 of the red pixel RX includes the organic material generating the red light, the first organic light emitting layer OEL1 of the green pixel GX includes the organic material generating the green light, and the first organic light emitting layer OEL1 of the blue pixel BX includes the organic material generating the blue light.

The first organic light emitting layer OEL1 may include a low molecular weight or high molecular weight organic material. Although not shown in figures, the first organic light emitting layer OEL1 may have a multi-layer structure of a hole injection layer, a hole transport layer, an emission layer, an electron transport layer, and an electron injection layer.

The hole injection layer may be disposed on the first electrode E1, and the hole transport layer, the emission layer, the electron transport layer, and the electron injection layer are sequentially stacked on the hole injection layer.

A second electrode E2 is disposed on the pixel definition layer PDL and the first organic light emitting layer OEL1. The second electrode E2 may be referred to as a common electrode, a cathode electrode, or an output terminal. The second electrode E2 may include a transmissive electrode or a reflective electrode.

When the first organic light emitting diode OLED1 is a front surface light emitting type, the first electrode E1 is the reflective electrode and the second electrode E2 is the transmissive electrode. When the first organic light emitting diode OLED1 is a rear surface light emitting type, the first electrode E1 is the transmissive electrode and the second electrode E2 is the reflective electrode.

The first organic light emitting diode OLED1 is disposed in the first pixel area PA1 and includes the first electrode E1, the first organic light emitting layer OEL1, and the second electrode E2. The first electrode E1 is a positive electrode, e.g., a hole injection electrode, and the second electrode E2 is a negative electrode, e.g., an electron injection electrode.

A first source voltage is applied to the first electrode E1 and a second source voltage having an opposite polarity to that of a driving source voltage is applied to the second electrode E2, by the first transistor TR1, to allow the first organic light emitting layer OEL1 of the first organic light emitting diode OLED1 to emit light.

In this case, holes and electrons are injected into the first organic light emitting layer OEL1 and recombined with each other to generate excitons, and the excitons return to a ground state from an excited state. As a result, the first organic light emitting diode OLED1 emits light. The first organic light emitting diode OLED1 emits the red, green, and blue lights in accordance with a current flow to display predetermined image information.

Figure 3B:
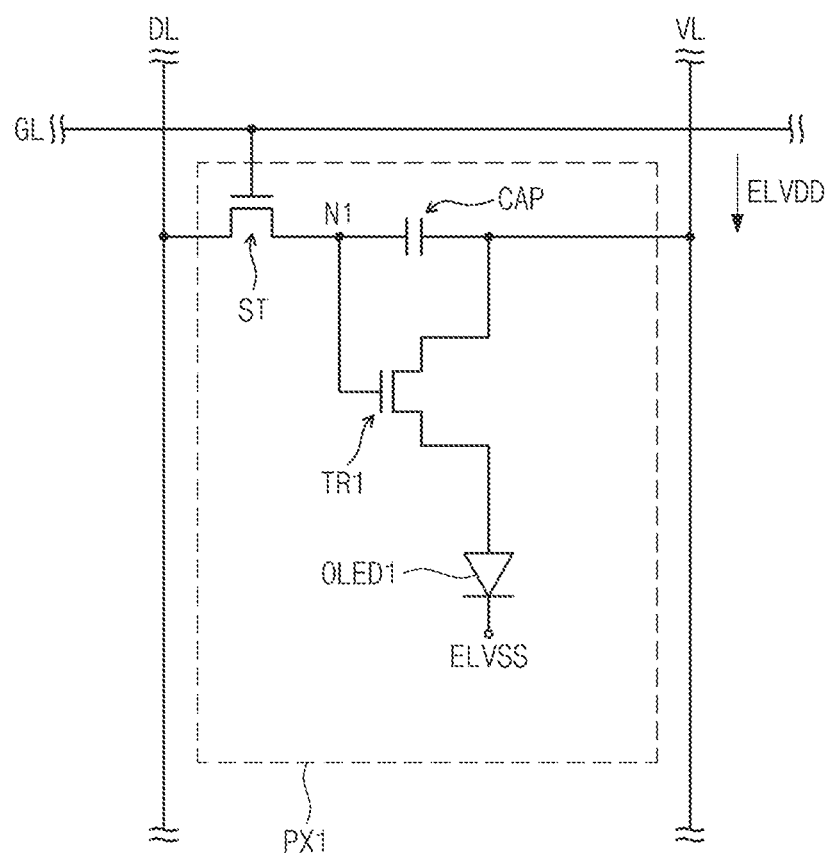
FIG. 3B is an equivalent circuit diagram showing a first pixel.

FIG. 3B is an equivalent circuit diagram showing a first pixel PX1.

Referring to FIG. 3B, the first pixel PX1 of the organic light emitting display apparatus 1000 includes a first transistor TR1, the first organic light emitting diode OLED1, a capacitor CAP, and a switching transistor ST. The switching transistor ST is connected to the gate line GL, the data line DL, and the capacitor CAP. The first transistor TR1 is connected to the capacitor CAP, a source voltage line VL, and the first organic light emitting diode OLED1.

The switching transistor ST includes a control terminal (or a gate terminal) connected to the gate line GL, an input terminal (or a source/drain terminal) connected to the data line DL, and an output terminal (or a drain/source terminal) connected to a control terminal of the first transistor TR1 or a source terminal.

The first transistor TR1 includes the control terminal (or a gate terminal) connected to the output terminal of the switching transistor ST, an input terminal (or a source/drain terminal) applied with a first source voltage ELVDD, and an output terminal (or a drain/source terminal) connected to the positive electrode of the first organic light emitting diode OLED1.

The capacitor CAP includes a first capacitor electrode connected to the output terminal of the switching transistor ST and a second capacitor electrode applied with a second source voltage ELVSS. A contact point at which the control terminal of the first transistor TR1 is connected to the output terminal of the switching transistor ST is referred to as a first node N1.

The control terminal of the switching transistor ST receives a gate signal, to turn on the switching transistor ST. More particularly, the switching transistor ST is turned on in response to the gate signal. The turned-on switching transistor ST applies a data voltage provided through the data line DL to the first transistor TR1.

The capacitor CAP is charged with the data voltage provided from the switching transistor ST and maintains the charged voltage after the switching transistor ST is turned off. The data voltage charged in the capacitor CAP is a driving voltage to drive the first transistor TR1 and is applied to the control terminal of the first transistor TR1, to turn on the first transistor TR1.

The first transistor TR1 is turned on until the data voltage charged in the capacitor CAP is completely discharged. A driving current is provided to the first organic light emitting diode OLED1 through the turned-on first transistor TR1, and thus the first organic light emitting diode OLED1 emits light.

Figure 4A:
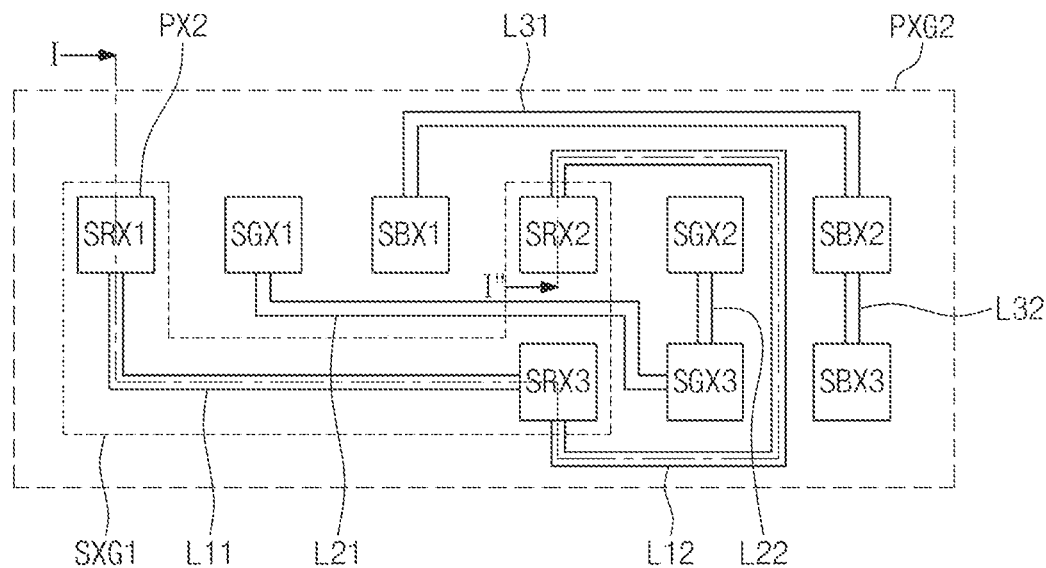
FIG. 4A, FIG. 4B, and FIG. 4C are enlarged views showing a second pixel group.
Figure 4B:
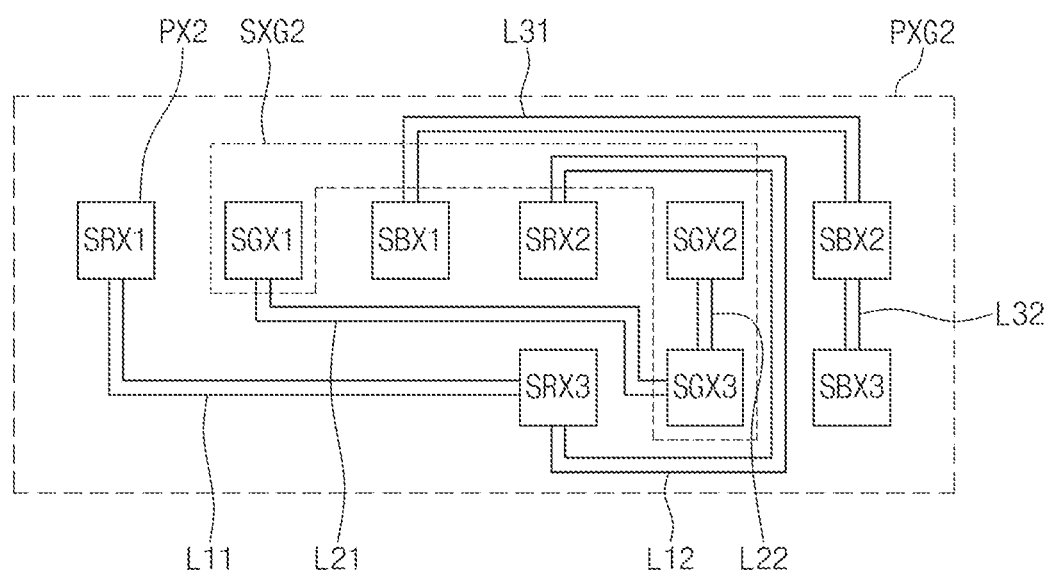
Figure 4C:
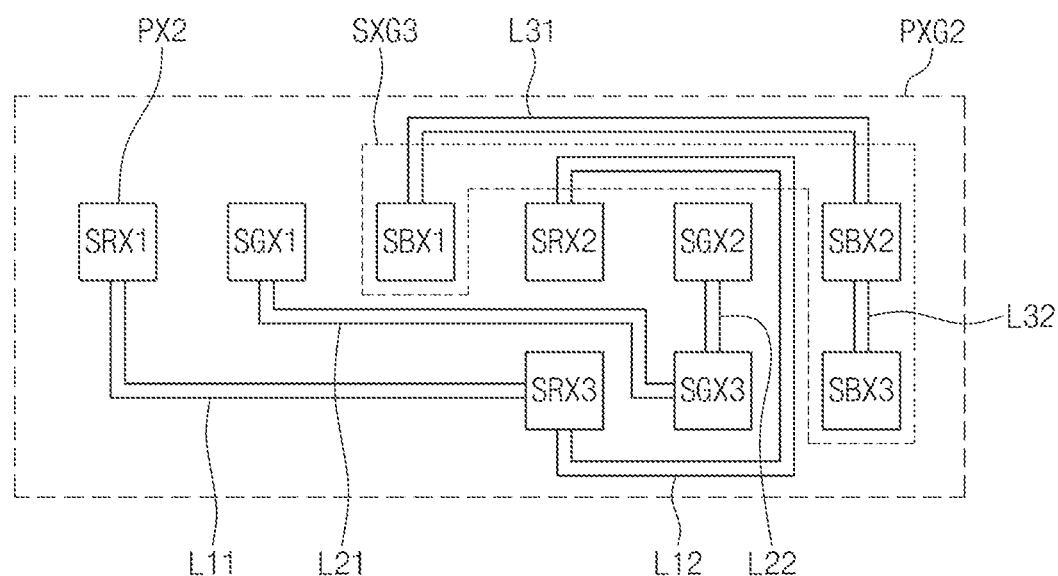

FIGS. 4A to 4C are enlarged views showing a second pixel group PXG2.

Referring to FIGS. 4A to 4C, each of the second pixel groups PXG2 includes first, second, and third sub-pixel groups SXG1, SXG2, and SXG3. Each of the first to third sub-pixel groups SXG1 to SXG3 is connected to a corresponding gate line of the gate line GL1 to GLm and a corresponding data line of the data lines DL1 to DLn.

The first to third sub-pixel groups SXG1 to SXG3 display different colors from each other. For instance, the first sub-pixel group SXG1 displays a red color, the second sub-pixel group SXG2 displays a green color, and the third sub-pixel group SXG3 displays a blue color.

FIGS. 4A to 4C show only the first to third sub-pixel groups SXG1 to SXG3, but the second pixel group PXG2 according to the present exemplary embodiment may further include a fourth sub-pixel group (not shown) displaying a white color.

Each of the first to third sub-pixel groups SXG1 to SXG3 includes second pixels PX2. As shown in FIG. 4A, the second pixels PX2 of the first sub-pixel groups SXG1 include first, second, and third sub-pixels SRX1, SRX2, and SRX3 displaying the red color. The first to third sub-pixels SRX1 to SRX3 are disposed to be spaced apart from each other.

As shown in FIG. 4B, the second pixels PX2 of the second sub-pixel groups SXG2 include fourth, fifth, and sixth sub-pixels SGX1, SGX2, and SGX3 displaying the green color. The fourth to sixth sub-pixels SGX1 to SGX3 are disposed to be spaced apart from each other.

As shown in FIG. 4C, the second pixels PX2 of the third sub-pixel groups SXG3 include seventh, eighth, and ninth sub-pixels SBX1, SBX2, and SBX3 displaying the blue color. The seventh to ninth sub-pixels SBX1 to SBX3 are disposed to be spaced apart from each other.

Each of the first to ninth sub-pixels SRX1 to SRX3, SGX1 to SGX3, and SBX1 to SBX3 has a size smaller than that of each of the first pixels RX, GX, and BX shown in FIG. 2. For example, the size of the first pixels RX, GX, and BX is three times greater than one sub-pixel of the first to ninth sub-pixels SRX1 to SRX3, SGX1 to SGX3, and SBX1 to SBX3.

The first sub-pixel SRX1 is disposed adjacent to the fourth sub-pixel SGX1 and the fourth sub-pixel SGX1 is disposed adjacent to the seventh sub-pixel SBX1. The first sub-pixel SRX1, the fourth sub-pixel SGX1, and the seventh sub-pixel SBX1 form one row.

The second sub-pixel SRX2 is disposed adjacent to the fifth sub-pixel SGX2 and the fifth sub-pixel SGX2 is disposed adjacent to the eighth sub-pixel SBX2. The second sub-pixel SRX2, the fifth sub-pixel SGX2, and the eighth sub-pixel SBX2 form one row.

The third sub-pixel SRX3 is disposed adjacent to the sixth sub-pixel SGX3 and the sixth sub-pixel SGX3 is disposed adjacent to the ninth sub-pixel SBX3. The third sub-pixel SRX3, the sixth sub-pixel SGX3, and the ninth sub-pixel SBX3 form one row.

The second pixel group PXG2 further includes first connection lines L11 and L12, second connection lines L21 and L22, and third connection lines L31 and L32. The first, second, and third connection lines L11 and L12, L21 and L22, and L31 and L32 electrically connect the first to ninth sub-pixels SRX1 to SRX3, SGX1 to SGX3, and SBX1 to SBX3 to each other.

The first, second, and third connection lines L11 and L12, L21 and L22, and L31 and L32 have a width smaller than a width of the first to ninth sub-pixels SRX1 to SRX3, SGX1 to SGX3, and SBX1 to SBX3. Alternatively, the width of the first, second, and third connection lines L11 and L12, L21 and L22, and L31 and L32 may be substantially the same as the width of the first to ninth sub-pixels SRX1 to SRX3, SGX1 to SGX3, and SBX1 to SBX3. The first, second, and third connection lines L11 and L12, L21 and L22, and L31 and L32 include a transparent electrode, such as indium tin oxide (ITO), or a metal including a reflective material.

The first sub-pixel SRX1 is electrically connected to the third sub-pixel SRX3 through the first connection line L11 and the third sub-pixel SRX3 is electrically connected to the second sub-pixel SRX2 through the first connection line L12. The fourth sub-pixel SGX1 is electrically connected to the sixth sub-pixel SGX3 through the second connection line L21 and the sixth sub-pixel SGX3 is electrically connected to the fifth sub-pixel SGX2 through the second connection line L22. The seventh sub-pixel SBX1 is electrically connected to the eighth sub-pixel SBX2 through the third connection line L31 and the eighth sub-pixel SBX2 is electrically connected to the ninth sub-pixel SBX3 through the third connection line L32.

FIGS. 4A to 4C show the arrangement of the first to ninth sub-pixels SRX1 to SRX3, SGX1 to SGX3, and SBX1 to SBX3 as a representative example. According to an exemplary embodiment of the present invention, the arrangement of the first to ninth sub-pixels SRX1 to SRX3, SGX1 to SGX3, and SBX1 to SBX3 of the second pixel group PXG2 may have various arrangements as the first to ninth sub-pixels SRX1 to SRX3, SGX1 to SGX3, and SBX1 to SBX3 are spaced apart from each other.

Figure 5A:
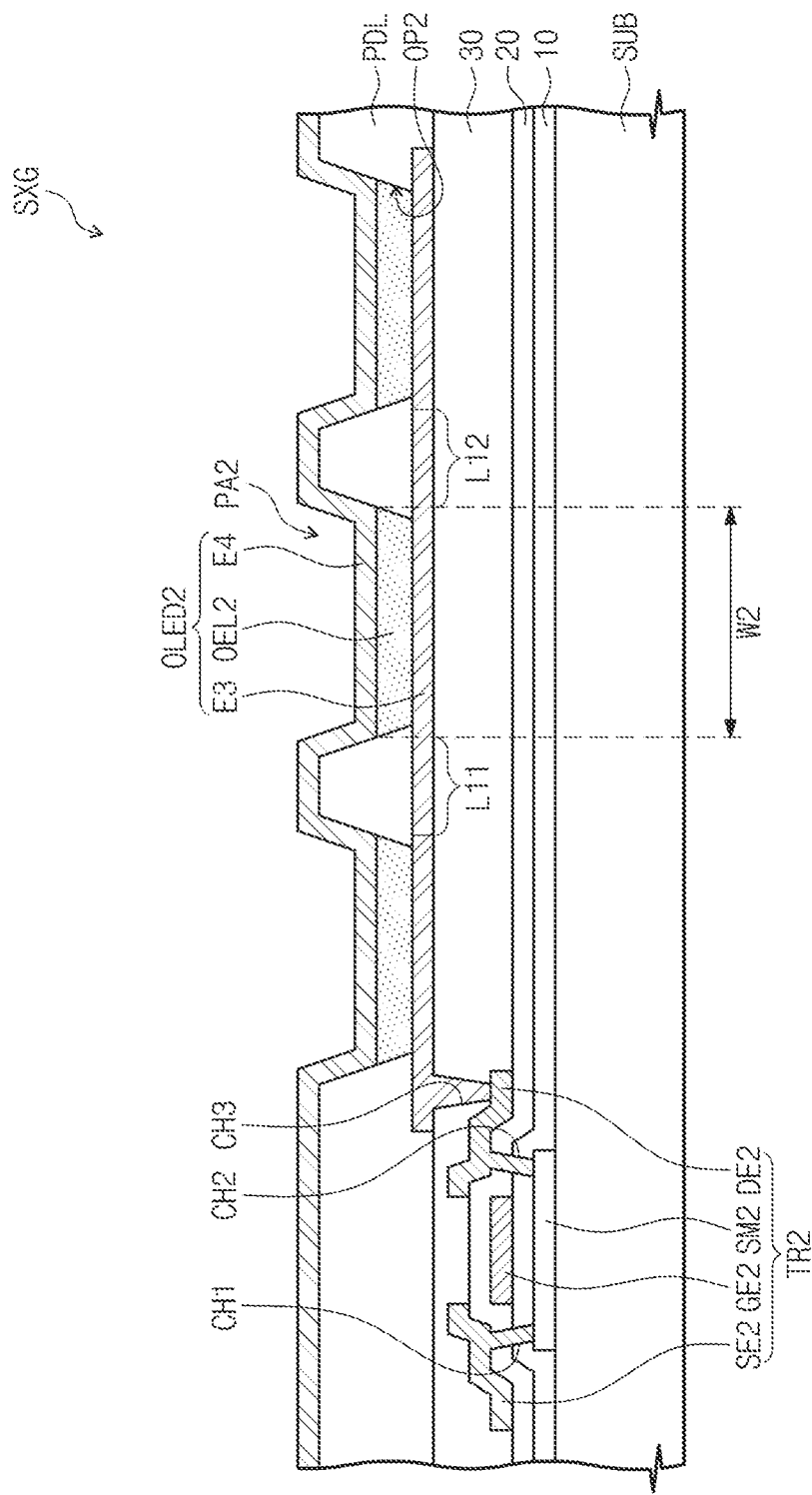
FIG. 5A is a cross-sectional view taken along line I-I" of FIG. 4A.

FIG. 5A is a cross-sectional view taken along line I-I" of FIG. 4A. For the convenience of explanation, FIG. 5A shows only one sub-pixel group among the first to third sub-pixel groups SXG1 to SXG3 of the second pixel group PXG2.

Referring to FIG. 5A, the sub-pixel group SXG includes second organic light emitting diodes OLED2 and a second transistor TR2 connected to the second organic light emitting diodes OLED2.

The second transistor TR2 and first, second, and third insulating layers 10, 20, and 30 shown in FIG. 5A have the same structure and function as those of the first transistor TR1 and the first to third insulating layers 10 to 30 illustrated with reference to FIG. 3A, and thus repeated descriptions of the second transistor TR2 and first, second, and third insulating layers 10, 20, and 30 will be omitted.

A third electrode E3 is disposed on the third insulating layer 30 and extends horizontally. The third electrode E3 is connected to a second drain electrode DE2 of the second transistor TR2 through a third contact hole CH3 formed through the third insulating layer 30. The third electrode E3 may be a pixel electrode or an anode electrode.

A pixel definition layer PDL is disposed on the extending third electrode E3 and the third insulating layer 30. The pixel definition layer PDL includes second openings OP2 formed therethrough to expose predetermined areas of the third electrode E3. The areas corresponding to the second openings OP2 are referred to as second pixel areas PA2.

Each of the second pixel areas PA2 has a second width W2. The second width W2 is smaller than the first width W1 shown in FIG. 3A. More particularly, the second pixel areas PA2 have a size smaller that the size of the first pixel areas PA1.

The second pixel areas PA2 respectively correspond to the first, second, and third sub-pixels SRX1, SRX2, and SRX3. Each of the second pixel areas PA2 may correspond to the pixel areas of the fourth, fifth, and sixth sub-pixels SGX1, SGX2, and SGX3 or the seventh, eighth, and ninth sub-pixels SBX1, SBX2, and SBX3 illustrated with reference to FIGS. 4A to 4C.

Second organic light emitting layers OEL2 are disposed on the third electrode E3 in the second openings OP2 to respectively correspond to the second openings OP2. The second organic light emitting layers OEL2 shown in FIG. 5A include the same organic material.

The third electrode E3 may include one of the first, second, and third connection lines L11 and L12, L21 and L22, and L31 and L32 shown in FIGS. 4A to 4C. More particularly, the third electrode E3 electrically connects the second pixel areas PA2 to each other.

The third electrode E3 extends and is connected to the first, second, and third sub-pixels SRX1, SRX2, and SRX3. The first connection line L11 extending from the third electrode E3 of the first sub-pixel SRX1 is connected to the third electrode E3 of the third sub-pixel SRX3, and the first connection L12 extending from the third electrode E3 of the third sub-pixel SRX3 is connected to the third electrode E3 of the second sub-pixel SRX2.

FIG. 5A shows only the first connection lines L11 and L12, but the second connection lines L21 and L22 or the third connection lines L31 and L32 may be disposed in the area in which the first connection lines L11 and L12 are disposed according to an exemplary embodiment of the present invention.

When each second organic light emitting diode OLED2 is a rear surface light emitting type organic light emitting diode, the third electrode E3 is a transmissive electrode and a fourth electrode E4 is a reflective electrode. When each second organic light emitting diode OLED2 is a front surface light emitting type organic light emitting diode, the third electrode E3 is the reflective electrode and the fourth electrode E4 is the transmissive electrode.

A first source voltage is applied to the third electrode E3 and a second source voltage having an opposite polarity to that of a driving source voltage is applied to the fourth electrode E4, by the second transistor TR2, to allow the second organic light emitting layers OEL2 of the second organic light emitting diodes OLED2 to emit light.

In this case, holes and electrons are injected into the second organic light emitting layers OEL2 and recombined with each other to generate excitons, and the excitons return to a ground state from an excited state. As a result, the second organic light emitting diodes OLED2 emits light.

Each of the second organic light emitting diodes OLED2 has a size smaller than the size of each of the first organic light emitting diodes OLED1. For example, the size of the first organic light emitting diode OLED1 is three times greater than the size of the second organic light emitting diode OLED2.

Figure 5B:
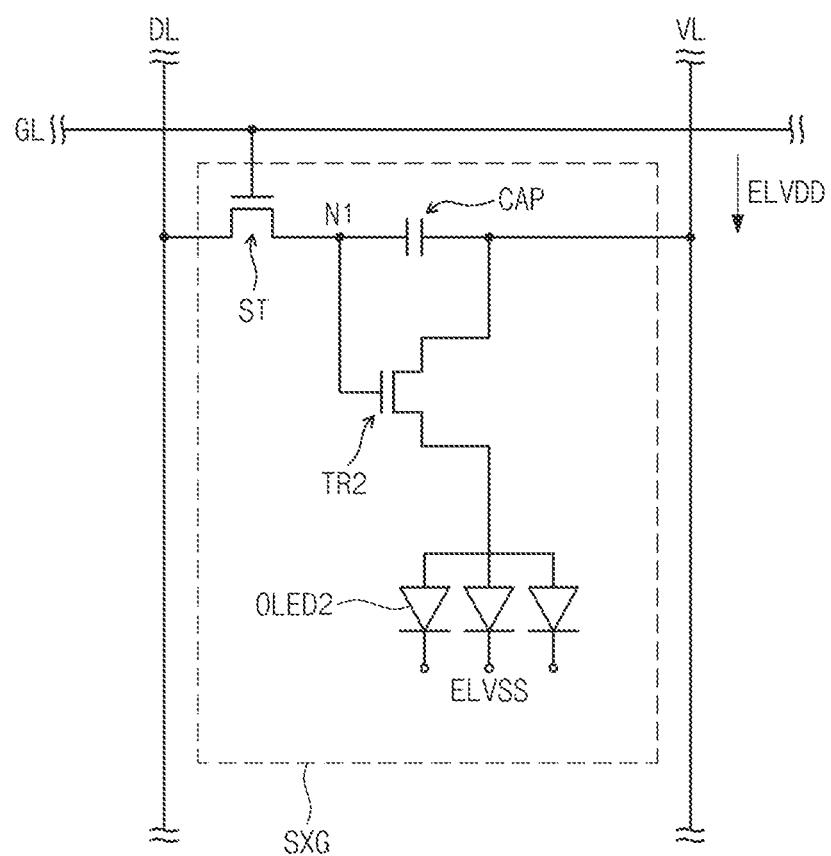
FIG. 5B is an equivalent circuit diagram showing a sub-pixel group.

FIG. 5B is an equivalent circuit diagram showing a sub-pixel group.

The first, second, and third sub-pixel groups SRX, SGX, and SBX may have substantially the same structure and function. Accordingly, FIG. 5B shows the equivalent circuit diagram of one sub-pixel group SXG among the first, second, and third sub-pixel groups SXG1, SXG2, and SXG3. Hereinafter, an operation of the one sub-pixel group SXG among the first, second, and third sub-pixel groups SXG1, SXG2, and SXG3 will be described in detail with reference to FIG. 5B.

Referring to FIG. 5B, the sub-pixel group SXG of the organic light emitting display apparatus 1000 includes the second transistor TR2, the second organic light emitting diodes OLED2, a capacitor CAP, and a switching transistor ST.

The switching transistor ST is connected to the gate line GL, the data line DL, and the capacitor CAP. The second transistor TR2 is connected to the capacitor CAP, the source voltage line VL, and the second organic light emitting diodes OLED2 connected to each other in parallel.

The switching transistor ST includes a control terminal (or gate terminal) connected to a gate line GL, an input terminal (a source/drain terminal) connected to a data line DL, and an output terminal (a drain/source terminal) connected to a control terminal of the second transistor TR2.

The second transistor TR2 includes the control terminal (or gate terminal) connected to the output terminal of the switching transistor ST, an input terminal (a source/drain terminal) receiving a first source voltage ELVDD or a drain terminal, and an output terminal (a drain/source terminal) connected to a positive electrode of the first organic light emitting diode OLED1.

The capacitor CAP includes a first capacitor electrode connected to the output terminal of the switching transistor ST and a second capacitor electrode receiving a second source voltage ELVSS.

A contact point at which the control terminal of the second transistor TR2 makes contact with the output terminal of the switching transistor ST is referred to as a first node N1.

The control terminal of the switching transistor ST receives a gate signal, to turn on the switching transistor ST. More particularly, the switching transistor ST is turned on in response to the gate signal. The turned-on switching transistor ST applies the data voltage provided through the data line DL to the first node N1.

The capacitor CAP is charged with the data voltage provided from the switching transistor ST and maintains the charged voltage after the switching transistor ST is turned off. The voltage charged in the capacitor CAP is a driving voltage to drive the second transistor TR2 and is applied to the control terminal of the second transistor TR2, to turn on the second transistor TR2. The second transistor TR2 is turned on in response to the voltage charged in the capacitor CAP.

The driving current is provided to the second organic light emitting diodes OLED2 through the turned-on second transistor TR2, and thus the second organic light emitting diodes OLED2 simultaneously emit light.

In a display apparatus that includes a display area, which has a curved shape along the boundary thereof, the pixels disposed at the boundary area may not have the curved shape. Accordingly, the boundary may be perceived as a sawtooth or step without being perceived as the curved shape. Therefore, a display quality of the image may be deteriorated in the boundary of the display area DA.

The display apparatus 1000 according to the present exemplary embodiment includes sub-pixels SRX1 to SRX3, SGX1 to SGX3, and SBX1 to SBX3 arranged in the boundary area and having the size smaller than the first pixel group PX1, which may improve a resolution of the boundary area of the display area DA. Accordingly, the boundary area may be perceived as a smooth curved line to a viewer, thus improving the display quality.

In addition, the size of the sub-pixels SRX1 to SRX3, SGX1 to SGX3, and SBX1 to SBX3 arranged in the boundary area of the display apparatus 1000 is reduced, but the number of the organic light emitting diodes driven by one transistor increases. More particularly, the sub-pixels SRX1 to SRX3, SGX1 to SGX3, and SBX1 to SBX3 may be driven by the same current amount required to drive one first pixel PX1. Accordingly, power consumption of the display apparatus 1000 is reduced, in which the display apparatus 1000 may operate the organic light emitting diodes more efficiently and improve the display quality.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display apparatus, comprising:
    first pixel groups each comprising first pixels disposed in a display area, each of the first pixels comprising a first transistor; and
    second pixel groups each comprising sub-pixel groups disposed at an outermost area of the display area and surrounding the first pixel groups,
    wherein:
    each of the sub-pixel groups comprises second pixels which are electrically connected to each other in parallel and a second transistor driving the second pixels together in each of the sub-pixel groups;
    the first pixels are driven in a one-to-one correspondence with the first transistor, and the second pixels in each of the sub-pixel groups are driven together by the second transistor which is different from the first transistor; and
    each of the second pixels has a size smaller than a size of each of the first pixels.

2. The display apparatus of claim 1, wherein a boundary of the display area has a curved shape.

3. The display apparatus of claim 2, wherein the display area has a circular shape or an oval shape.

4. The display apparatus of claim 1, wherein the first pixels of each of the first pixel groups comprise a red pixel, a green pixel, and a blue pixel.

5. The display apparatus of claim 4, wherein the second pixels of each of the sub-pixel groups comprise sub-pixels configured to display the same color.

6. The display apparatus of claim 4, wherein the second pixels of each of the sub-pixel groups comprise sub-pixels configured to display different colors from each other.

7. The display apparatus of claim 6, wherein the second pixels of each of the sub-pixel groups comprise a red sub-pixel, a green sub-pixel, and a blue sub-pixel.

8. The display apparatus of claim 1, wherein each of the first pixels further comprises:
a first organic light emitting diode driven by the first transistor.

9. The display apparatus of claim 8, wherein the first organic light emitting diode comprises:
a first electrode connected to the first transistor;
a first organic light emitting layer disposed on the first electrode and comprising an organic material; and
a second electrode disposed on the first organic light emitting layer.

10. The display apparatus of claim 8, wherein:
each of the second pixels comprises a second organic light emitting diode configured to be driven by the second transistor.

11. The display apparatus of claim 10, wherein the second organic light emitting diode has a size smaller than a size of the first organic light emitting diode.

12. The display apparatus of claim 10, wherein:
the second transistor comprises:
a control terminal connected to a data line through a switching device, the switching device configured to be turned on in response to a gate signal;
an input terminal connected to a first source voltage line, the first source voltage line configured to receive a first source voltage; and
an output terminal connected to input terminals of the second organic light emitting diodes; and
output terminals of the second organic light emitting diodes are connected to a second source voltage line configured to receive a second source voltage having a voltage level less than the first source voltage.

13. The display apparatus of claim 10, wherein:
each of the second organic light emitting diodes comprise:
a third electrode connected to an output terminal of the second transistor;
a second organic light emitting layer disposed on the third electrode and comprising an organic material; and
a fourth electrode disposed on the second organic light emitting layer; and
the third electrodes of the second organic light emitting diodes are electrically connected to each other.

14. The display apparatus of claim 13, further comprising connection lines connecting the third electrodes to each other.

15. The display apparatus of claim 14, wherein the connection lines have a width less than or equal to a width of the third electrodes.

16. The display apparatus of claim 15, wherein the third electrodes comprise the same material as the connection lines.

17. The display apparatus of claim 16, wherein each of the third electrodes comprises a transmissive electrode and the fourth electrode comprises a reflective electrode.

18. The display apparatus of claim 16, wherein each of the third electrodes comprises a reflective electrode and the fourth electrode comprises a transmissive electrode.

19. The display apparatus of claim 1, wherein an area of each of the first pixels disposed in the first pixel groups is the same as sum of areas of the second pixels disposed in each of the sub-pixel groups.

20. The display apparatus of claim 19, wherein the number of second pixels disposed in an area of each of the second pixel groups is greater than the number of first pixels disposed in an area of each of the first pixel groups.

* * * * *